Aug. 30, 1955
L. M. LEATHERS
2,716,511
LIQUID-DELIVERY TUBE
Filed April 24, 1953
2 Sheets-Sheet 1
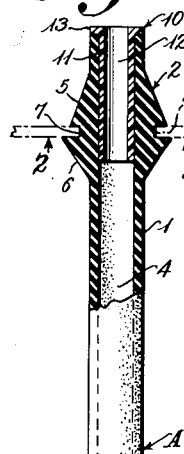
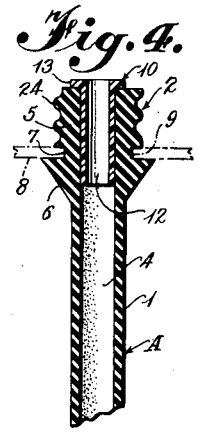
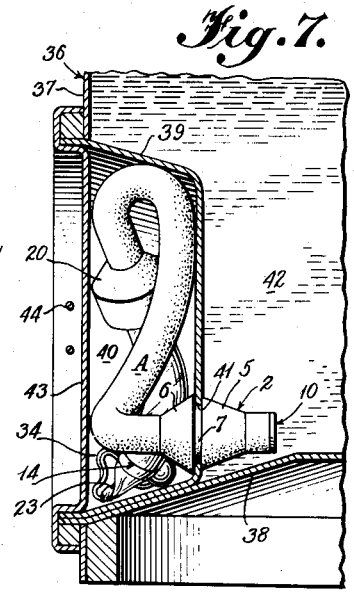
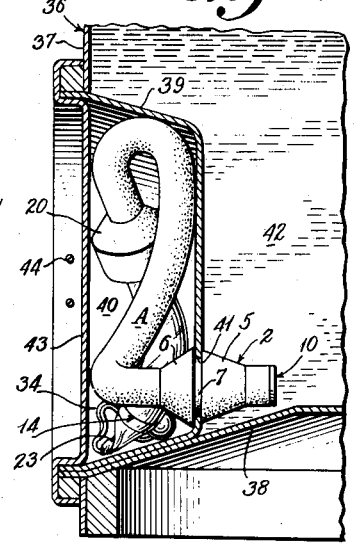
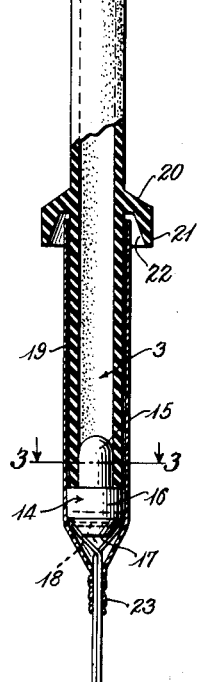
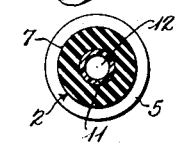
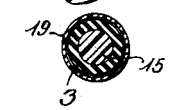
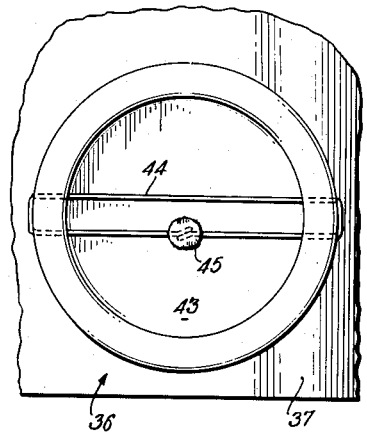
INVENTOR
*Leon M. Leathers*
BY *Jewett, Mead, Brown & Schuyler*
ATTORNEYS Aug. 30, 1955 L. M. LEATHERS 2,716,511
LIQUID-DELIVERY TUBE
Filed April 24, 1953 2 Sheets-Sheet 2
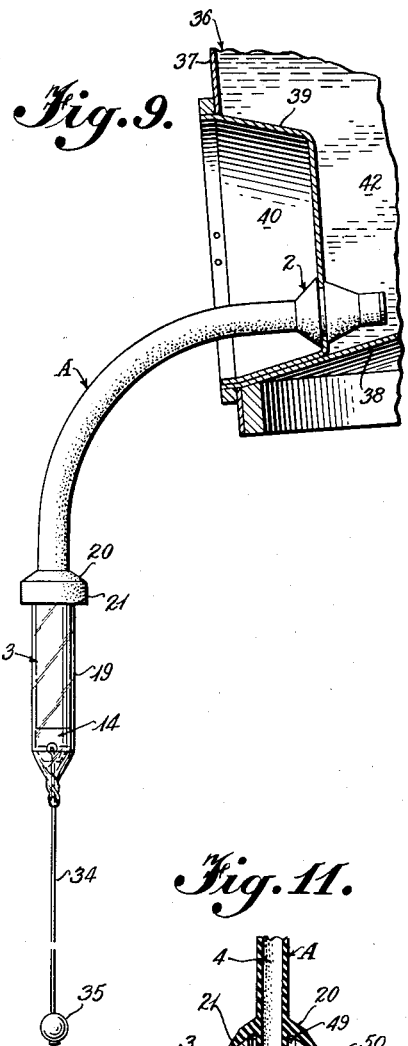
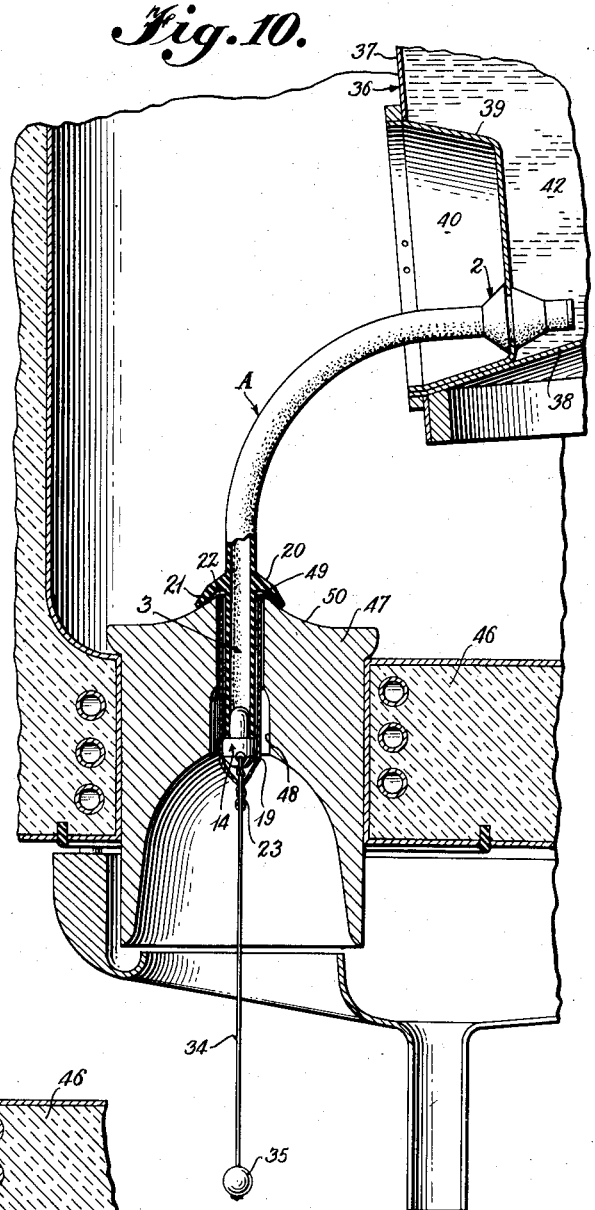
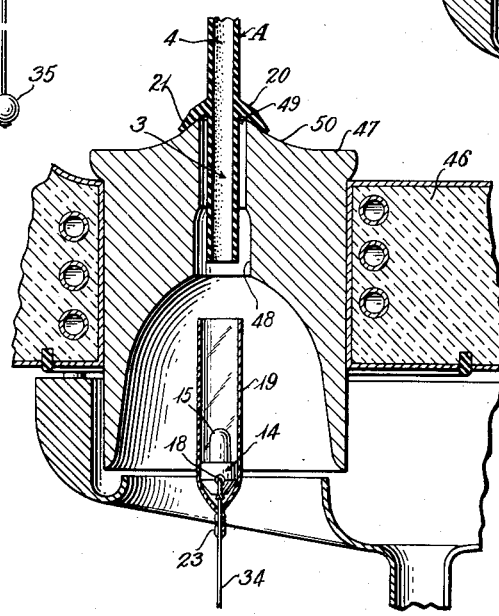
INVENTOR
*Leon M. Leathers*
BY *Jewett, Mead, Browne & Schuyler*
ATTORNEYS United States Patent Office 2,716,511
Patented Aug. 30, 1955

2,716,511

LIQUID-DELIVERY TUBE

Leon M. Leathers, Athens, Ga., assignor to L. M. Leathers' Sons, Athens, Ga., a partnership Application April 24, 1953, Serial No. 351,005

16 Claims. (Cl. 222—529)

This invention relates to a liquid delivery tube and more particularly to a delivery tube which may be readily attached to a container to deliver liquid contained in the container to a desired location.

The present invention is directed broadly to the problem of providing a discharge arrangement for discharging the contents of a liquid container where the liquid is of the type which is subject to being contaminated easily and where it is also desired that the discharge of liquid from the container be metered so that equal portions of liquid may be successively discharged from the container. Stated another way, the present invention is concerned with the problem of providing a sanitary spigot or spout for a bulk liquid container whereby the liquid in the container may be delivered from the container to a desired discharge point without being contaminated by the spigot or spout and wherein the spigot or spout is so constructed that for a given pressure, the same amount of liquid will flow through the spigot or spout for equal units of time.

A delivery tube constructed in accordance with the teaching of the present invention has been found to have particular utility as a delivery tube for delivering milk from a bulk milk container to the discharge orifice or outlet of a milk dispenser in which the bulk milk container is located, and wherein the dispenser dispenses individual portions of milk from the bulk source of milk. Accordingly, the present invention is described hereinafter as regards its utility as a delivery tube for delivering milk although it will be understood by those skilled in the art that a delivery tube constructed in accordance with the teaching of the present invention may also be utilized to deliver other liquids where the problems regarding sanitation and uniform delivery are similar to those involving milk.

To be satisfactory as a delivery tube for delivering milk from a bulk milk container to the discharge orifice of a milk dispenser, such as a customer operated dispenser, the delivery tube must be sanitary at the time it is connected between the bulk milk container and the dispenser discharge orifice. In addition, the flow passage through the delivery tube should not be exposed to the outside air until the dispenser is ready for operation. In other words, the flow passage through the delivery tube should be kept sealed until the dispenser is ready for operation.

From a practical standpoint, the delivery tube should be so constructed that it can be readily attached to or detached from the bulk milk container whereby each time that it is desired to make ready a bulk milk container for use in a milk dispenser, a sterilized delivery tube may be attached to the container and maintained in a sterile condition from the time the delivery tube is attached to the container until the container is placed in the milk dispenser and the delivery tube is connected to the discharge orifice of the dispenser. Since all of the milk dispensed from the milk dispenser flows through the delivery tube, the delivery tube should also serve to predetermine the volume of flow so that, in conjunction with the control mechanism of the milk dispenser, successive equal portions of milk may be dispensed from the bulk source of milk. In other words, the delivery tube should perform a metering function.

It is accordingly an object of the present invention to provide a new and improved liquid delivery tube to serve as a spigot or spout for a liquid container in order to deliver liquid from the container to a desired location and where it is extremely important that the delivery tube be sanitary.

It is another object of the present invention to provide such a delivery tube which is protected against exposure to contamination and which may be readily attached to and detached from a bulk liquid container and maintained in a sanitary condition until, and while, liquid is discharged from the container.

It is a further object of the present invention to provide such a delivery tube which performs a metering function in discharging liquid from the container to a desired location.

It is still another object of the present invention to provide a new and improved liquid delivery tube assembly wherein the liquid delivery tube is kept sanitary by inner and outer protective coverings.

The foregoing objects are attained in an embodiment of a liquid delivery tube constructed in accordance with the teaching of the present invention as follows: The delivery tube is an elongated flexible rubber tube, of relatively small diameter compared to its length, having an inlet end and a delivery end. At the inlet end of the tube, the exterior of the tube is enlarged to provide, in effect, an enlarged grommet having a groove extending circumferentially about it whereby the grommet can be secured in an opening extending through the wall of a bulk liquid container. For a milk container, wherein the container wall is of sheet metal construction, the opening in which the grommet is seated will be located adjacent the bottom of the milk container and will be a circular opening having a depth of only that of the sheet metal wall of the container. The diameter of the opening is such that the circular sheet metal edge defining the opening is seated in the groove of the grommet section and securely attaches the delivery tube to the milk container.

The flexible delivery tube has an interior passage or flow passage extending throughout its length from the inlet end to the delivery end and, when it is desired to allow milk to flow through the delivery tube, this passage is open at both ends of the tube. In order to insure that the cross sectional area of the opening into the tube at the inlet end of the tube does not change when the tube is in use for delivering milk, a metering plug is positioned at the inlet end of the tube. This metering plug is preferably in the form of an elongated hollow cylinder and is of such size that it may be inserted lengthwise into the delivery tube, at the inlet end, and will be securely retained by the flexible wall of the delivery tube. Since the metering plug is made of relatively rigid material, it is apparent that it will provide a substantially uniform cross sectional area of opening at the inlet end of the delivery tube and thus assure that a given volume of milk will flow through the delivery tube for a given pressure and during a given unit of time. The metering plug thus assists the delivery tube to perform a metering function which is important for the successful operation of a customer operated milk dispenser.

The delivery tube itself performs a metering function since the cross-sectional area of the flow passage through the tube can also be predetermined with substantial accuracy to provide a given rate of flow for a given pressure. Thus, where the bulk liquid container is provided with a fitting over which the inlet end of the delivery tube is slipped to attach the delivery tube to the bulk liquid container, rather than having an opening into which the inlet tube is inserted, the delivery tube will provide metering because of the uniform cross-sectional area of the fluid-flow passage which extends lengthwise through the delivery tube.

Prior to the time that the delivery end of the delivery tube is positioned in the discharge orifice of the milk dispenser and the dispenser is ready for operation, the delivery end is blocked off by an end plug and enclosed by a removable protective covering. This protective covering is a close-fitting covering extending along the tubular wall at the delivery end portion of the delivery tube. The covering may be made of cellophane or other suitable material.

When the delivery end of the delivery tube is initially positioned in the discharge orifice of a milk dispenser, the delivery end portion of the tube is still left covered by its protective covering. Then, when the milk dispenser is readied for operation and a suitable flow control means has been associated with the flexible tube to control fluid flow through it, the end plug in the delivery end of the tube may be pulled out to open said delivery end. When the end plug is pulled out, the protective covering is likewise pulled away from the delivery end of the tube so as not to impede the flow of milk from the tube.

In order to properly position and support the delivery end of the tube with relation to a discharge orifice of a milk dispenser, an annular hood extends from and about the tubular wall adjacent to the delivery end of the tube. Thus, when the delivery end of the tube is inserted into the discharge orifice of a dispenser, the hood may rest against the entry mouth of the discharge orifice and assist in positioning the delivery end of the tube in said orifice. In addition, the hood performs a function of preventing condensate or other foreign matter from falling into the discharge orifice from above where the delivery end of the tube is positioned in a vertical direction downward. The removable protective covering which encloses the delivery end of the tube preferably encloses the end plug also and extends to the aforementioned annular hood thus protecting the entire delivery end portion of the tube while the latter is being inserted into the discharge orifice of the milk dispenser.

In practice, a delivery tube will be attached to a bulk milk container at a central location such as a dairy where the milk container is filled with bulk milk. To maintain the milk delivery tubes in sterile condition, they will be individually packaged in air-tight containers having of course been first sealed at the delivery ends in the manner mentioned above. Thus, in attaching a delivery tube to a bulk milk container at a central location, such as a dairy, an attendant will take a delivery tube package and break the outer package in order that the tube can be attached to the milk container. Then, the attendant can dip the inlet end of the tube into a sterilizing solution of suitable type and attach it to the bulk milk container. At this time the delivery end of the tube is still sealed and covered by the protective covering which was applied to it before the whole tube was packaged in its outer covering.

After the delivery tube has been attached to the bulk milk container the balance of the tube, including the sealed delivery end portion, can be coiled within a suitable receptacle in the milk container and a cover put over said pocket or receptacle whereupon the milk container is ready for shipment to the location where the dispenser is located. Then the bulk milk container can be placed in operative position within or with relation to the milk dispenser and the delivery end of the tube properly positioned in the discharge orifice of the milk dispenser. When the dispenser has been readied for operation, then the end plug and the removable protective covering can be pulled from the delivery end of the delivery tube thus permitting milk to flow from said delivery end when the control means dictates that it should flow.

Other objects and advantages of the present invention will become more apparent from the following detailed description taken in conjunction with the attached drawings in which:

Fig. 1 is a view showing an embodiment of a delivery tube constructed in accordance with the teaching of the present invention in a vertical position with the inlet end of the tube being uppermost and the delivery end of the tube being lowermost, said tube being shown attached to a liquid container, indicated in dotted outline;

Fig. 2 is a sectional view taken on line 2—2 of Fig. 1;

Fig. 3 is a sectional view taken on line 3—3 of Fig. 1;

Fig. 4 is a view showing a modified portion of the tube shown in Fig. 1;

Fig. 5 is a view similar to Fig. 4 showing still another modified portion of the tube shown in Fig. 1;

Fig. 6 is a view showing the delivery tube shown in Fig. 1 housed within a protective covering;

Fig. 7 is an elevation view, partly in section, showing a portion of a bulk liquid container having a pocket housing the liquid delivery tube attached to said container;

Fig. 8 is a front elevation view of a portion of a bulk liquid container showing the pocket cover for the pocket shown in Fig. 7;

Fig. 9 is a view showing the delivery tube extending from the bulk liquid container and prior to insertion of the delivery end of the delivery tube in a discharge orifice;

Fig. 10 is a view similar to Fig. 9 but showing, in addition, the delivery end of the delivery tube inserted in a discharge orifice of a liquid dispensing machine; and Fig. 11 is a view of a portion of the structure shown in Fig. 10 and also showing the delivery end of the delivery tube as being uncovered and in condition to discharge liquid from the bulk liquid container.

As previously mentioned, a delivery tube constructed in accordance with the teaching of the present invention has particular utility as a delivery tube for conducting milk from a bulk milk container to the discharge orifice or discharge nozzle of a milk dispensing machine which dispenses individual portions of milk to customers. Referring now to the drawings for a more detailed description of such a delivery tube, the delivery tube as a whole is indicated by the reference character A in Fig. 1. As so shown, it is apparent that the tube is an elongated relatively narrow tube comprising an elongated tubular wall 1 having opposite ends indicated by the reference numerals 2 and 3. End 2 is the inlet or entry end of the tube and end 3 is the exit or delivery end of the tube.

Tubular wall 1 defines a passage 4 extending completely through the tube from end to end. Preferably wall 1 is a cylindrical wall and, also preferably, it is flexible, being made of rubber, for example, so that it can be curved or folded readily if desired.

Adjacent the inlet end 2 of the tube, is located an enlarged or thickened portion of tubular wall 1 having tapered flange sections 5 and 6 which define an annular groove 7 extending about the tubular wall between the flange sections 5 and 6. The construction just described is in effect a grommet construction which enables the inlet end of the tube to be attached to and project within a bulk liquid container, the grommet sections 5 and 6 serving to retain the tube firmly attached to the container.

This is shown in Fig. 1 where 8 represents a wall section of a liquid container, for example, a wall of a bulk milk container such as a milk can containing five, ten or more gallons of milk. Wall 8 has an opening therethrough defined by edge 9 and this opening receives the enlarged portion of tubular wall 1 having the flange or grommet sections 5 and 6 thereon. The opening defined by edge 9 is preferably a circular opening although, of course, its shape will be determined by the shape of tubular wall 1. When the inlet end of the tube is seated in the opening defined by edge 9, this edge is seated in groove 7 and is thus gripped by the flange portions 5 and 6. In attaching the tube to the wall 8, and since the tube is preferably entirely of rubber or other material having sufficient flexibility for the purpose, the enlarged portion of tubular wall 1 may be pushed into the opening defined by wall edge 9 until the edge of flange 5 passes over wall edge 9 and grips the wall on the opposite side of flange 6. When the inlet end 2 of the tube is thus positioned with respect to the liquid container wall 8 said inlet end is located within the container and is in position to receive liquid from the container and conduct it to passage 4.

The embodiment shown in Fig. 1 includes a metering plug 10 located at the inlet end of the tube. The purpose of metering plug 10 is to provide an accurate cross-sectional area through which liquid must flow in going from the interior of the bulk liquid container to delivery passage 4. With the cross-sectional area accurately predetermined by means of such a metering plug, it is possible then to calculate the pressure and time required for a given amount of liquid to flow from the bulk milk container. It is thus possible to set up a practical control for shutting off and starting flow of liquid through the tube to provide equal individual portions of milk.

Metering plug 10 comprises an elongated portion 11 which defines an opening or passage 12 extending lengthwise through the plug. Plug 10 is made of substantially rigid material and will preferably be made of a plastic material. Passage 12 has a uniform cross-sectional area throughout its length, this cross-sectional area being predetermined in advance in accordance with the metering rate of flow desired through the plug. An annular flange 13 on the plug abuts against the very end of inlet end 2 of the tube and the plug is maintained in position by the grip imposed by the portion of tubular wall 1 which surrounds the plug. If desired, plug 10 could be secured in position by means of a suitable adhesive or other securing means. Plug 10 is disposable and it is obvious that a number of plugs may be made available, said plugs having different sizes for passage 12 whereby a particular plug may be selected for a particular rate of flow requirement.

In those instances where the bulk milk container is provided with a nipple or fitting over which the inlet end of the delivery tube is slipped or otherwise fitted to attach the delivery tube to the container, it is usually unnecessary to utilize a separate metering plug to achieve metering. Instead, reliance may be placed upon the accuracy of the cross-sectional area of the passage through the container nipple or fitting and flow passage 4 to provide the necessary metering.

In Fig. 1 of the drawings, delivery end 3 of the tube is shown as being closed, or plugged up, by an end plug indicated generally by the reference numeral 14. This end plug 14 is for the purpose of maintaining the interior passage 4 from exposure to the outside air until the delivery tube has been suitably connected in a dispenser and the assembly is made ready to actually start the discharge of milk from a bulk container. Thus, even though the inlet end 2 of the delivery tube is attached to a bulk milk container, the delivery end is not exposed until it is intended that the delivery tube should be in condition to actually transfer milk from the bulk milk container to an intended location.

End plug 14 has a blocking or extending portion 15 which extends into passage 4 from delivery end 3 of tube A and completely blocks passage 4 at the delivery end of the tube. In other words, the size of blocking portion 15 is such that it completely fills the cross-sectional area of passage 4 at delivery end 3 of the tube. Blocking portion 15 extends from a portion 16 of the end plug which abuts against delivery end 3 of tube A as shown in Fig. 1. A depending ear or projection 17 extends from portion 16 and is provided with an opening 18 for a purpose later described.

As another sanitary feature of the delivery tube, a portion of the length of tubular wall 1 extending from the very end of the delivery end 3 of the tube is covered by a protective or sealing cover 19 as shown in Fig. 1. This protective cover also covers end plug 14 and extends lengthwise along tubular wall 1 to a flange 20 which projects from tubular wall 1 as shown in Fig. 1. This annular flange 20 has a lip portion 21 which extends toward delivery end 3 in spaced relation to tubular wall 1 and, together with said tubular wall, defines an annular recess 22 between the lip portion and the tubular wall as shown in Fig. 1. Thus, in the upright position shown in Fig. 1, flange 20 with its continuous lip 21 forms, in effect, a hood projecting from and about tubular wall 1. The purpose of this hood is described later.

Protective covering 19 extends from the very end of delivery end 3 of the tube along the length of the tube and up under hood 20 as shown in Fig. 1. In other words, the protective covering extends to within space 22 located between lip portion 21 of hood 20 and tubular wall 1. It is thus apparent that the entire delivery end portion of tube A which extends downward from hood 20 is covered by a protective covering.

Protective covering 19 is preferably a close-fitting covering which is but slightly spaced from tubular wall 1 throughout the delivery end portion of the tube. Being slightly spaced from the tubular wall, it can be readily removed when the end plug 14 is removed. If desired, the protective covering could have a looser fit or could actually engage the tubular wall 1 like a skin. However, from the standpoint of both sanitation and ease of removal, a relatively close fit with but little spacing between the covering and the tubular wall is preferred. It is apparent that the protective covering 19 assists end plug 14 in protecting delivery passage 4 from exposure to the outside air at the delivery end of the tube.

In the modified construction shown in Fig. 4, the inlet end 2 of tube A is an enlarged end portion having a thread 24 formed on its outer surface as shown in Fig. 4 whereby the inlet end may be screwed or twisted into opening 9 to attach the delivery tube to liquid container wall 8. When the entry end is fully twisted or screwed into opening 9, flange portion 6 will abut against wall 8 as shown in Fig. 4 and the inlet end will thus be firmly retained in position. This is simply an alternative construction for facilitating positioning of the inlet end 2 of the tube in the liquid container, and the tube is otherwise similar to that described in connection with Fig. 1. Further description is therefore deemed to be unnecessary.

In the modified construction shown in Fig. 5, metering is performed by a cup-shaped metering member, indicated generally by the reference numeral 25, rather than by a metering plug such as shown in Figs. 1 and 4. Thus, in the Fig. 5 construction, the inlet end 2 of tube A has a straight extension 26 over which cup 25 is fitted and securely attached to hold the cup in position. The side wall 27 of the cup, assuming that the cup is a cylindrical cup and that extension 26 is a cylindrical extension, securely grips extension 26. Flat portion 28 of the cup is seated against the very end of inlet end 2 and defines an opening 29 which communicates with passage 4. Thus, the cross-sectional area of opening 29 may be predetermined in advance and it will thus be known what volume of flow will occur through passage 4 for a given pressure and a given period of time. Like metering plug 10, metering cup 25 will be made of substantially rigid material so that opening 29 will not become deformed, and this material will preferably be a plastic material. Also, it is obvious that metering cup 25 may be adhesively or otherwise secured to extension 26 if so desired. The tube construction shown in Fig. 5 is otherwise similar to the tube construction described in connection with Fig. 1 and further detailed description of the Fig. 5 embodiment is therefore deemed to be unnecessary.

In the sequence of utilizing a liquid delivery tube constructed in accordance with the teaching of the present invention as a milk delivery tube for conducting milk from a bulk milk container to the discharge outlet of a milk dispensing apparatus, a preferred practice is to attach a delivery tube to a bulk milk container at a central location, such as a dairy, and then deliver the container having the tube attached thereto to a dispensing location, such as a restaurant, where the delivery tube is fitted into a milk dispenser apparatus. While this is a preferred practice, it will be obvious that the delivery tube could be attached to the bulk milk container at the dispensing location if desired.

Inasmuch as sanitation is an important feature of the present invention, individual liquid delivery tubes are separately packaged by being enclosed in protective coverings which exclude outside air from reaching a delivery tube after it has been inserted within its protective covering and the latter has been sealed. It is therefore apparent that a quantity of protected delivery tubes may be stocked at a central location, such as a dairy, whereupon, each time that it is desired to attach a delivery tube to a bulk milk container, one of the delivery tubes can be taken from stock, the outer protective covering removed, and the delivery tube attached to the bulk milk container.

A protected, or packaged, delivery tube is shown in Fig. 6, the tube being of the type shown in Fig. 1. As so shown, it is apparent that the delivery tube, including the end plug 14 and the protective covering 19 which is attached to the tube, is housed entirely within an outer protective covering 31. Outer covering or housing 31 may be made of transparent material such as cellophane although it is obvious that any other suitable material, plastic or otherwise, may be utilized so long as the material is capable of substantially completely excluding outside air from reaching the delivery tube after it has been placed within the outer covering and the latter sealed. As shown in Fig. 6, outer covering 31 has opposite ends 32 and 33 which are crimped sealed ends although, of course, one of the ends could be a permanently closed end and the other end could be sealed closed after the delivery tube has been inserted within cover 31.

In Fig. 6, end plug 14 is shown as having a drawstring 34 attached thereto and the drawstring has a button 35 at one end thereof which may be grasped to yank the string in order to withdraw plug 14 from the delivery end 3 of the tube as is later described. Drawstring 34 extends through inner protective covering 19 and the latter is secured to the drawstring as indicated at 23 so as to enclose both the delivery end of the tube and end plug 14. In effect, protective covering 19 is sealed to drawstring 34 at 23 and is therefore drawn from the delivery end of the tube by drawstring 34 when end plug 14 is withdrawn.

In practice, tube 1, including plug 14 and its associated drawstring 34, will be sterilized prior to being placed within protective covering 31. Then, when the protective cover is sealed, the delivery tube and its associated parts are maintained in sterile condition and thus may be stocked at a central location, such as a dairy, to be selected for attachment to a bulk container as desired.

A portion of a bulk milk container adapted to have such a delivery tube attached thereto at a central location such as a dairy is shown in Fig. 7. The bulk milk container, indicated generally by the reference numeral 36, includes a side wall 37 and a bottom wall 38, these walls being made preferably of sheet metal such as is used in conventional bulk milk cans capable of holding five, ten or more gallons of milk. Milk container 36 has, adjacent the bottom wall thereof, an inset wall portion 39 which defines a recess or pocket 40 in the milk container. Wall 39, which is also preferably a sheet metal wall, has an opening 41 extending completely therethrough, said opening being located closely adjacent the bottom wall 38 of the milk container. Opening 41 is preferably a circular opening of such size that the edge of wall 39 which defines the opening will seat substantially completely in groove 7 defined by flanges 5 and 6 located adjacent the inlet end 2 of tube A.

It is therefore apparent that when it is desired to attach a delivery tube to a bulk milk container, the sterile delivery tube can be removed from its protective covering 31 and the inlet end 2 of the tube forced into opening 41 until the wall edge which defines this opening seats in groove 7 of the tube. Since the tube is preferably made of rubber sufficiently flexible for the purpose, it is evident that when the inlet end of the tube is so inserted, flange 5 will be depressed until the outer edge of this flange springs outwardly once the flange has cleared the opening. In the embodiment shown in Fig. 4, the inlet end will of course be screwed into the opening until it is fully inserted with respect thereto.

When the delivery tube is attached to the bulk milk container, the inlet end 2 of the tube projects into the interior 42 of the container and is thus in position to receive milk contained by the container. The balance of the delivery tube, including the still sealed delivery end 3 of the tube, which is blocked by end plug 14 and covered by protective covering 19, is located within pocket 40 of bulk milk container 36. The size of pocket 40 is such as to readily accommodate the folded-up delivery tube. After the delivery tube has been attached to the milk container and then folded so as to lie within pocket 40, a cover 43 is placed over pocket 40 in order to enclose and protect the delivery tube from contamination from the outside. If desired, cover 43 may have a seal attached thereto to safeguard against tampering with the cover. Thus, a wire 44 is shown as being looped through the cover and the flanges of the milk container engaged by the cover, and the ends of the wire are joined by a plug 45 so that should the cover be removed prior to the time that it is intended to be removed, such premature removal can be detected.

With the cover 43 in place as described and the delivery tube housed within pocket 40, the bulk milk container can then be filled with fresh milk and is ready for delivery to a receiving location, such as a restaurant, for placement in a milk dispensing apparatus. It is apparent that the delivery tube is protected in transit by being totally enclosed in pocket 40. In practice, when the inlet end 2 of the tube is inserted into opening 41, the inlet end is first dipped in a sterilizing solution and then inserted into opening 41. This factor, plus the fact that the delivery end of the tube is still sealed, plus the further fact that the tube is housed within pocket 40, all assure that sanitation is maintained in the readying of the milk container for delivery to a receiving location. The milk container is thus provided, in effect, with a sanitary spigot or spout.

After the milk container has reached its intended location and it is desired to place the delivery end 3 of the delivery tube in position in a discharge outlet of a milk dispenser apparatus, wire 44 is broken and cover 43 removed from pocket 40. This frees the delivery tube from restraint and it can thus depend from the bulk milk container as is shown in Fig. 9. In the position shown in Fig. 9, milk can flow through the delivery tube, under the influence of gravity, after end plug 14 is removed from the delivery end 3 of the tube. However, this plug is preferably not removed until after the delivery end 3 of the tube has been suitably positioned in a discharge outlet of the milk dispenser.

An example of such a discharge outlet arrangement is shown in Fig. 10 and described and claimed in application Serial No. 339,335 filed February 27, 1953, and assigned to the assignee of the present invention. As so shown, the arrangement includes a bottom wall 46 of a casing which houses a bulk-milk container 36. Bottom wall 46 has a sanitary fitting 47 extending completely therethrough and this fitting, in turn, has a delivery passage 48 extending through the body of the fitting as shown in Fig. 10.

When it is desired to ready the milk dispenser for operation, and assuming that a discharge outlet arrangement is being employed as shown in Fig. 10, the delivery end 3 of delivery tube A is inserted into mouth 49 of delivery passage 48 of fitting 47. Delivery end 3 is extended lengthwise into passage 48 until lip 21 of flange or hood 20 engages that portion of the upper surface 50 of the fitting which is adjacent to and defines mouth 49 of passage 48. The parts are so proportioned that when this engagement takes place the delivery end 3 of tube A is located entirely within passage 48 and the very lower end of the delivery tube is within the lower enlarged portion of passage 48 shown in Fig. 10. With the vertical alignment as shown in Fig. 10, it is apparent that hood 20 prevents condensate or other foreign matter from dropping or otherwise entering passage 48 from above.

At this stage, the delivery tube is properly positioned in the discharge outlet and all that need be done, insofar as the tube is concerned, to enable the tube to conduct milk from the bulk milk container 36 is to remove end plug 14 and protective covering 19. However, prior to such removal, a suitable control valve or other arrangement will be engaged with the delivery tube to prevent flow through the tube until it is desired that flow should occur after such removal.

Assuming that a suitable flow-control arrangement has been so associated with the delivery tube, and such an arrangement is described and illustrated in the aforementioned application Serial No. 339,335, end plug 14 and protective covering 19 may be removed simultaneously by grasping button 35 and string 34 and then pulling on the string to withdraw the end plug and remove the protective covering from the delivery end of the delivery tube. Pulling on string 34 causes the hood-like flange 20 to be pulled against the upper surface 50 of sanitary fitting 47 and the flange is urged into firm engagement with this upper surface because of the elastic nature of tubular wall 1. The hood-like flange is thus drawn firmly over the mouth 49 of passage 48 which extends through sanitary fitting 47.

With the delivery end of the delivery tube thus opened for the first time since the delivery end was originally plugged up by plug 14 and covered by protective covering 19, the delivery tube may conduct milk from bulk milk container 36 when the control valve or other arrangement associated with the delivery tube permits the delivery tube to so conduct milk. Meanwhile, of course, the metering plug 10 located at the inlet end 2 of the plug functions to predetermine the volume of flow through the delivery tube for a given pressure and during a given unit of time.

It will thus be seen that the present invention provides a sanitary liquid delivery tube having especial utility as a delivery tube for delivering milk from a bulk milk container to the discharge outlet of a milk dispensing apparatus, such as a customer-operated milk vending machine. The construction of the delivery tube is such that sanitation is maintained from the time that the delivery tube is first sterilized and individually packaged up until the time that the delivery tube is connected into a milk dispenser and is made ready to discharge its first quantity of milk. Furthermore, the construction is such that sanitation is maintained even though the delivery tube is attached to the bulk milk container at a central location, such as a dairy, and is then shipped to a receiving location, such as a restaurant, where the milk dispensing apparatus is located.

The provision of protective covering 19 at the delivery end portion of the delivery tube insures that, during handling of the delivery tube when the delivery end portion is being inserted into the discharge outlet of a milk dispenser, the tubular wall 1 will not actually be touched by hand at the delivery end portion of the tube. Thus, when an attendant is actually inserting the delivery end portion into passage 48 of sanitary fitting 47, the attendant will naturally tend to grasp the delivery end portion of the tube in order to insert it properly. Should the attendant's fingers be dirty the tube could be contaminated closely adjacent to the very end of the tube where the milk is discharged. Any bacteria present in the contaminated area would therefore not have far to travel to reach the milk.

After the delivery end portion of the tube is inserted in passage 48 of sanitary fitting 47, said portion is protected by the sanitary fitting even though protective covering 19 is then removed. Sanitary fitting 47 thus also prevents direct touching of the delivery end portion of the tube. Further, since the delivery end portion of the tubular wall is elastic, hood-like flange 20 is pulled firmly down over passage 48 when draw-string 34 is pulled and this insures that the upper part of the delivery end portion of tubular wall 1 will not be unduly exposed.

While I have described and illustrated embodiments of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A liquid-delivery tube useful for conducting liquid from a bulk-liquid container to a discharge outlet of a liquid dispenser apparatus, said tube comprising an elongated tubular wall having an inlet end adapted to be attached to said container and a delivery end adapted to be inserted into said discharge outlet, said wall defining a fluid-flow passage extending from said inlet end to said delivery end, a hood-like flange extending from and surrounding said wall adjacent said delivery end whereby said flange can overlie the mouth of a discharge outlet into which said delivery end is inserted, and a removable protective covering enclosing said delivery end.

2. A liquid-delivery tube useful for conducting liquid from a bulk-liquid container to a discharge outlet of a liquid dispenser apparatus, said tube comprisnig an elongated tubular wall having an inlet end adapted to be attached to said container and a delivery end adapted to be inserted into said discharge outlet, said wall defining a fluid-flow passage extending from said inlet end to said delivery end, an end plug located at said delivery end and blocking off said fluid-flow passage at said delivery end, and a removable protective covering enclosing said end plug and said delivery end.

3. A liquid-delivery tube useful for conducting liquid from a bulk-liquid container to a discharge outlet of a liquid dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, a hood-like flange extending from and surrounding said wall adjacent said delivery end, said flange having a lip portion extending toward said delivery end and, together with said tubular wall, defining a recess located between said lip portion and said wall, an end plug located at said delivery end and blocking off said fluid passage at said delivery end, and a close-fitting removable protective covering enclosing said end plug and said delivery end, said protective covering extending from said delivery end to within said recess located between said flange lip and tubular wall.

4. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, an end plug located at said delivery end and extending into said fluid-flow passage at said delivery end, said end plug blocking off said fluid-flow passage at said delivery end, a close-fitting removable protective covering enclosing said end plug and the delivery end of said tubular wall, and a drawstring attached to said end plug and extending through said protective covering.

5. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, an annular flange extending from and surrounding said wall adjacent said delivery end, said flange having an annular lip portion extending toward said delivery end and, together with said tubular wall, defining an annular recess located between said lip portion and said wall, an end plug located at said delivery end and blocking off said fluid-flow passage at said delivery end, a close-fitting removable protective covering enclosing said end plug and said delivery end, said protective covering extending from said delivery end to within said annular recess, and a drawstring attached to said end plug and extending through said protective covering, said protective covering being attached to said drawstring whereby, when said drawstring is pulled to remove said end plug, said protective covering is also removed.

6. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, an annular hood-like flange extending from and surrounding said wall adjacent said delivery end whereby said flange can overlie the mouth of a discharge outlet into which said delivery end is inserted, and a substantially rigid removable metering plug supported by said tubular wall and located at said inlet end, said metering plug having a passage therethrough of predetermined cross-sectional area communicating with said fluid-flow passage.

7. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, an annular flange extending from and surrounding said wall adjacent said delivery end, said flange having a lip portion extending toward said delivery end, said lip portion being spaced from said tubular wall and, together with said tubular wall, defining an annular recess located between said lip portion and said tubular wall, said tubular wall having a thickened portion located adjacent said inlet end, said thickened portion defining a groove extending completely about said tubular wall adjacent said inlet end, said groove being adapted to receive the edge of a container wall opening into which said inlet end is inserted.

8. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, a substantially rigid removable metering plug gripped and supported by said tubular wall at said inlet end, said metering plug having a passage extending therethrough, said metering plug passage having a predetermined cross-sectional area and communicating with said fluid-flow passage, and a close-fitting removable protective covering enclosing said delivery end.

9. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, a substantially rigid metering plug located at said inlet end, said metering plug having a body portion enclosed and gripped by said tubular wall, said body portion having a passage extending lengthwise therethrough, said body-portion passage having a predetermined cross-sectional area and communicating with said fluid-flow passage, an annular flange extending from and surrounding said wall adjacent said delivery end, said flange including a lip portion extending toward said delivery end, said lip portion being spaced from said tubular wall and, together with said tubular wall defining an annular recess located between said lip portion and said tubular wall, and a close-fitting removable protective covering enclosing said delivery end, said protective covering extending from said delivery end to within said annular recess.

10. A sanitary liquid-delivery tube assembly comprising an elongated flexible tubular wall having an open inlet end and a delivery end, said wall defining a fluid-flow passage extending from said inlet end to said delivery end, an inner protective covering enclosing said delivery end and extending along said wall adjacent said delivery end, and an outer protective covering totally enclosing said tubular wall and said inner protective covering.

11. A sanitary liquid-delivery tube assembly comprising an elongated flexible tubular wall having an inlet end and a delivery end, said wall defining a fluid-flow passage extending from said inlet end to said delivery end, a hood-like flange extending from and surrounding said wall adjacent said delivery end, an inner protective covering enclosing said delivery end and extending along said wall from said delivery end to said flange, and an outer protective covering totally enclosing said tubular wall, flange and inner protective covering.

12. A sanitary liquid-delivery tube assembly comprising an elongated flexible tubular wall having an inlet end and a delivery end, said wall defining a fluid-flow passage extending from said inlet end to said delivery end, an annular flange extending from and surrounding said wall adjacent said delivery end, said flange having a lip portion extending toward said delivery end, said lip portion being spaced from said tubular wall and, together with said tubular wall, defining an annular recess located between said lip portion and said tubular wall, an end plug located at said delivery end and blocking off said fluid-flow passage at said delivery end, a close-fitting removable inner protective covering enclosing said delivery end and said end plug, said inner covering extending from said delivery end to within said annular recess, and an outer protective covering totally enclosing said tubular wall, flange, end plug, and inner protective covering.

13. A sanitary liquid-delivery tube assembly according to claim 12, including a drawstring attached to said end plug and extending through said inner protective covering, said drawstring also being enclosed by said outer protective covering.

14. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, means located at said delivery end blocking off said fluid-flow passage at said delivery end, a close-fitting removable protective covering enclosing said fluid-flow passage blocking off means and the delivery end of said tubular wall, and a drawstring attached to said fluid-flow passage blocking off means and extending through said protective covering.

15. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, a close-fitting removable protective covering enclosing said delivery end of said tubular wall, and a drawstring attached to said protective covering.

16. A liquid-delivery tube useful for conducting liquid from a bulk-liquid container to a discharge outlet of a liquid-dispenser apparatus, said tube comprising an elongated flexible tubular wall having an inlet end adapted to be attached to said container and a delivery end adapted to be inserted into said outlet, said wall defining a fluid-flow passage extending from said inlet end to said delivery end, means located at said delivery end blocking off said fluid-flow passage at said delivery end, a close-fitting removable protective covering enclosing said fluid-flow passage blocking off means and the delivery end of said tubular wall, and means to withdraw said fluid-flow passage blocking off means and said protective covering from said delivery end of said tubular wall, said withdrawing means being attached to said fluid-flow passage blocking off means and extending through said protective covering.

References Cited in the file of this patent

UNITED STATES PATENTS

| | | |
|---|---|---|
| 910,015 | Olson et al. | Jan. 19, 1909 |
| 1,513,342 | Nitardy | Oct. 28, 1924 |
| 2,377,261 | Norris | May 29, 1945 |
| 2,566,667 | Krihwan | Sept. 4, 1951 |